June 13, 1939. D. H. ZELL Re. 21,119

INDICATOR CONTAINER

Original Filed Nov. 25, 1933 3 Sheets-Sheet 1

Inventor
David H. Zell,
By M. C. Lyddane
Attorney

June 13, 1939. D. H. ZELL Re. 21,119

INDICATOR CONTAINER

Original Filed Nov. 25, 1933 3 Sheets-Sheet 2

Inventor
David H. Zell,
By M. C. Lydden
Attorney

June 13, 1939. D. H. ZELL Re. 21,119
INDICATOR CONTAINER
Original Filed Nov. 25, 1933 3 Sheets-Sheet 3
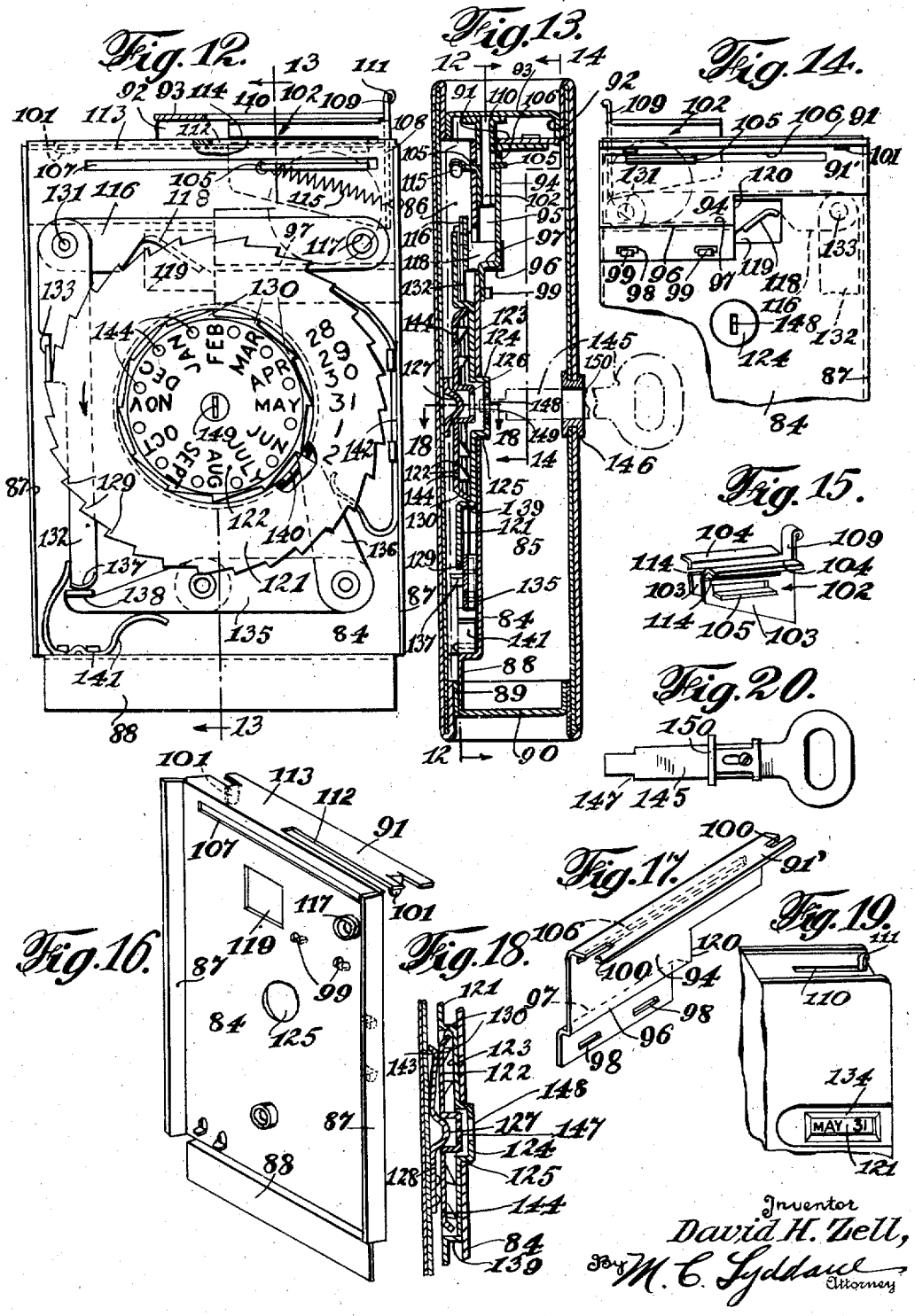
Inventor
David H. Zell,
By M. C. Lyddane
Attorney Reissued June 13, 1939 Re. 21,119

UNITED STATES PATENT OFFICE 21,119

INDICATOR CONTAINER

David H. Zell, Brooklyn, N. Y.

Original No. 2,105,065, dated January 11, 1938, Serial No. 699,685, November 25, 1933. Application for reissue March 10, 1938, Serial No. 195,198

8 Claims. (Cl. 235—100)

This invention relates to containers and is particularly adapted, although not confined, to the type of containers which are commonly referred to as banks or collection receptacles and which may be made in book or analogous forms.

An object of my invention is to provide an improved construction of this character having improved means automatically operated upon the deposit of each coin to visually shown if a coin has been deposited each day in accordance with the calendar or in accordance with a registration system. My invention is intended to induce thrift and systematic saving by requiring the deposit of a coin each day or the accumulation in the bank of a certain number of coins in a particular period of time.

One of the objects of my invention is to provide novel actuating mechanism for controlling suitable indicator dials and which is automatically operated by each coin deposited in the receptacle.

Another object of the invention is to provide actuating mechanism which will be positive and certain in operation, yet easily operated and effective to control the operation of dials adapted to contain indicia either for a calendar type system of registration or for a simple additive digit system.

Another object of the invention is to provide a novel plate or frame having actuating mechanism, dials and all necessary instrumentalities embodied in a single unitary compact structure which will be easy to insert in the container and to be secured therein so as to properly exhibit the indicia of the dials in suitable windows of the container.

It is also within the province of the invention to provide a form of construction having a coin-deposit mechanism so constructed and arranged with respect to the actuating mechanism for the indicator dials that the last-named mechanism cannot be operated by the functioning of the first-named mechanism until a coin has been deposited, the arrangement in this regard being such that a deposited coin, before it can pass into the collection chamber of the bank, must serve as a connection through which to operate the actuating mechanism when the coin-deposit mechanism is manually operated. Due to this arrangement, the indicator dials cannot be tampered with, nor can they be caused to register or display the succeeding day or date save by the actual deposit of a coin.

It is further within the province of the invention to provide a form of construction in which the month dial may be operatively seated or nested within a cup-shaped day dial, with the axes of the two dials in alignment and with their indicia-bearing faces in flush and close relationship. In this arrangement, the two compactly arranged dials may be operatively mounted in an inaccessible chamber where they cannot be tampered with, and means in the form of a key, manipulated from the outside of the casing, may be provided for resetting the dials initially or at any time they may require resetting.

In the device of my invention I have combined numerous improvements having to do with simplicity of parts, facility in their assembly, durability in their operation, and protection against tampering.

The nature of my invention, its general principles and objects above referred to, as well as other objects and advantages, and the manner in which the new and novel features of construction and operation may be embodied in practical form and means for the performance of the functions and the accomplishment of the results herein contemplated, will be hereinafter more fully described, with reference to the examples illustrated in the accompanying drawings, in which.

Figures 1, 2, 3, 4:
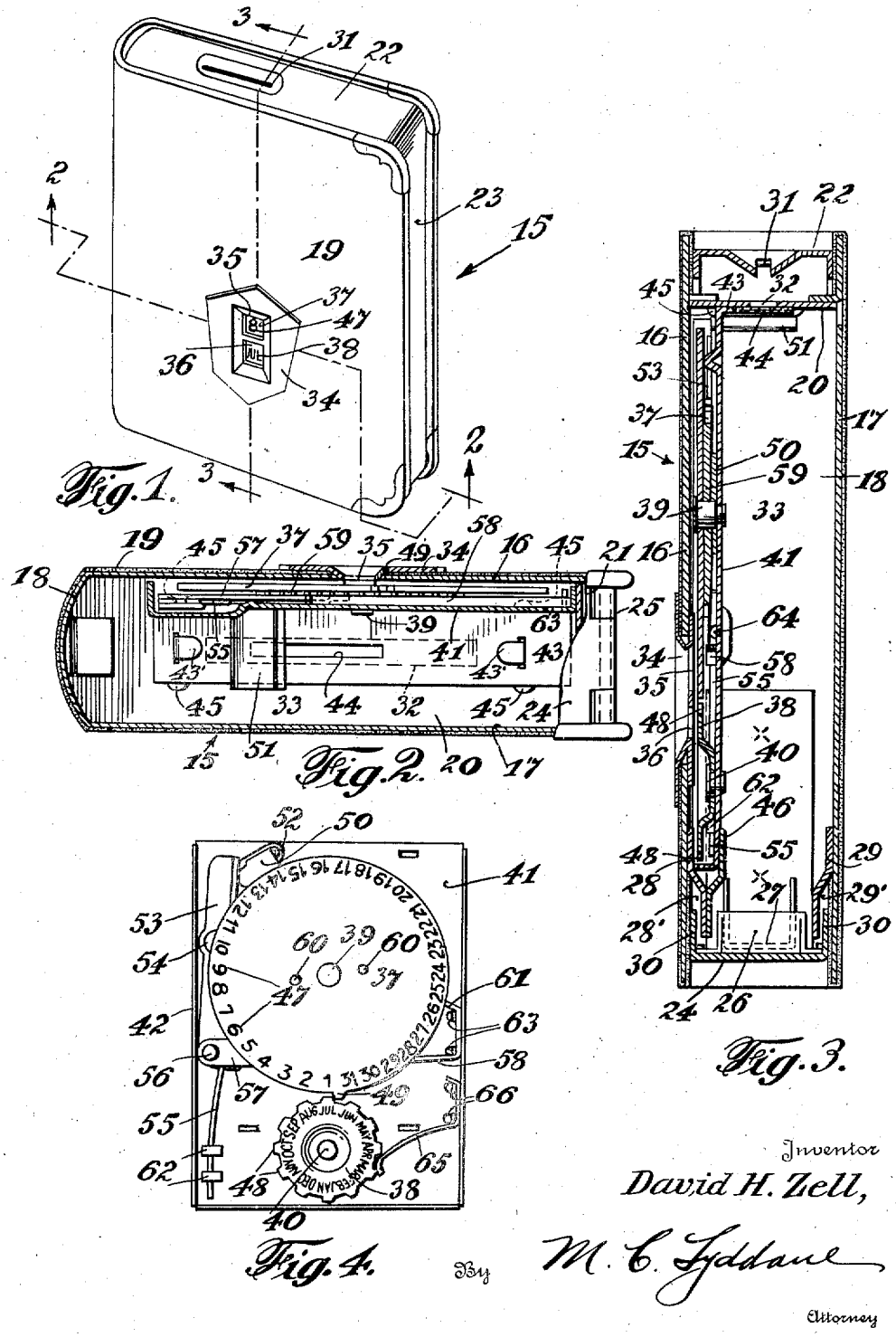
Fig. 1 is a perspective view showing a coin bank embodying my improvements.
Fig. 2 is a cross section taken on line 2—2 of Fig. 1.
Fig. 3 is a central vertical sectional view, taken on the line 3—3 of Fig. 1.
Fig. 4 is a front elevational view of the dial unit removed from the container.
Figure 5:
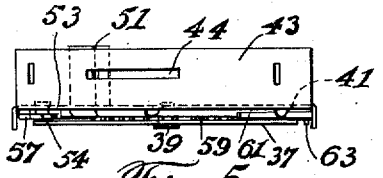
Figure 9:
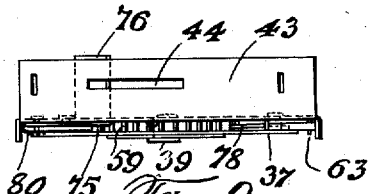
Figure 6:
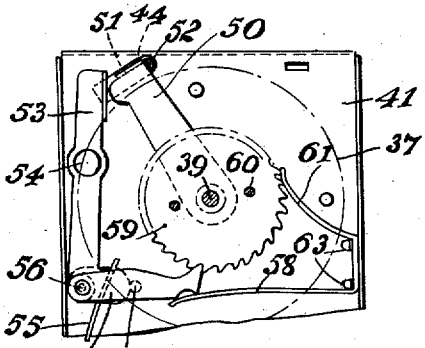
Figure 10:
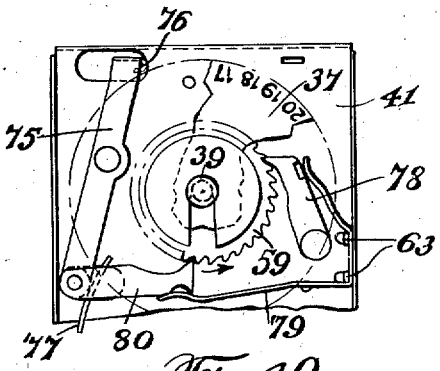
Figure 7:
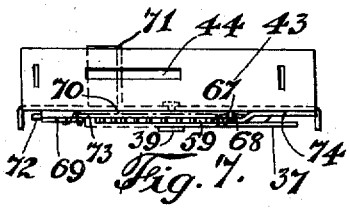
Figure 8:
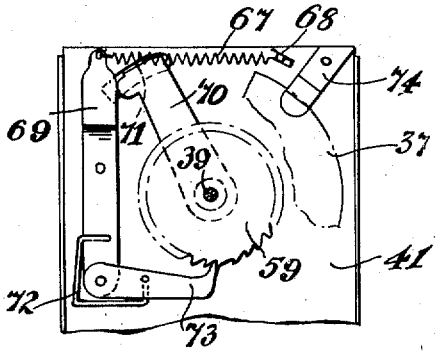
Figure 11:
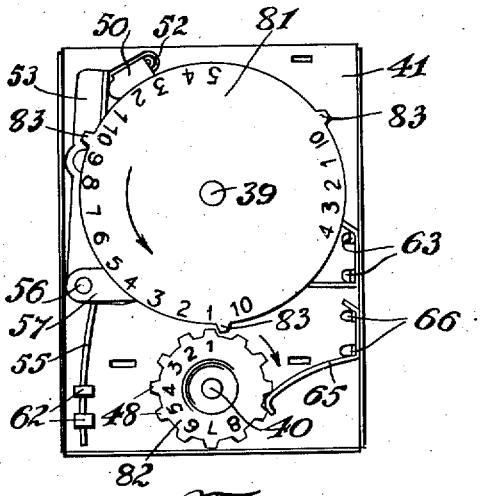

Figs. 5 and 6 are top and front views, respectively, of the unit shown in Fig. 4, said View 6 being fragmentary with both dials omitted and illustrating in particular the coin-operated mechanism for actuating the ratchet wheel, Figs. 7 and 8 are top and fragmentary front views, respectively, showing another form of the coin-operated mechanism for actuating the ratchet wheel, Figs. 9 and 10 are similar views showing still another form of the coin-operated mechanism for actuating the ratchet wheel;

Fig. 11 is a view similar to Fig. 4 but showing the dials bearing indicia comprising a simple additive digit system, Fig. 12 is an elevational view and part sectional view, showing another form of construction in which the indicator dials are mounted in nested arrangement and in which the coin-deposit mechanism and actuating mechanism are so arranged as to preclude the operation of the last-named mechanism save upon the deposit of a coin, Fig. 13 is a vertical sectional view, taken on the line 13—13 of Fig. 12, Fig. 14 is a partial elevational view, showing the coin-deposit mechanism from the side thereof opposite to that shown in Fig. 12, Fig. 15 is a detailed view of the coin-deposit slide, Fig. 16 is a perspective view of the partition which separates the working parts from the collection chamber, Fig. 17 is a similar view, showing the coin guide and runway plate which is associated with the partition, Fig. 18 is a cross section, taken on the line 18—18 of Fig. 13, Fig. 19 is a fragmentary view of the casing, showing the coin-deposit slot and the display window, and Fig. 20 is a detailed view of the key.

My present improvements are illustrated by way of example in connection with a book form of coin bank or container 15 the constructural features of which have been fully shown and described in my copending application for Letters Patent of the United States, Serial No. 529,479½, filed by me on April 11, 1931, and issued August 29, 1933, Patent No. 1,924,897. It is not deemed necessary, therefore, to describe herein in detail all of the constructural features of the coin bank itself, but only such parts and combinations thereof as will bring out clearly the application of my present improvements and the utility thereof.

By referring to Figs. 1, 2 and 3, it will be seen that the coin bank 15 is produced in simulation of a book and comprises similar opposing body walls 16 and 17 integrally connected by a rounded back edge end or wall 18. These walls are preferably produced from relatively heavy sheet metal and they are overlaid exteriorly with a covering 19 of leather or the like. An L-shaped strip produced from hard metal and comprising parts 20 and 21 unites the body walls 16 and 17 said parts 20 and 21 being located between the body walls 16 and 17 uniformly inwardly from the free edges thereof. A second L-shaped strip produced from thin sheet brass and comprising parts 22 and 23 is also connected between the body walls 16 and 17 inwardly of the free edges thereof to provide, respectively, facing walls at one transverse edge and at the front edges of the book form structure. The said facing walls 22 and 23, made of brass, are intended to have the effect of leaves incorporated between the body walls 16 and 17 and they may, in practice, be ridged, ribbed or otherwise formed in order to carry out the simulation of leaf edges between the covers of a book.

For the purpose of closing the open edge of the book structure, opposite the edge walls 20 and 22, I provide a brass door or closure 24 which is hingedly engaged at one end at 25 to the front edge wall 23, this door closure being adapted to fit snugly between the body walls 16 and 17 inwardly of the free edges thereof, as shown in Fig. 3. Connected with the inner side of the door or closure 24 is a lock housing 26 carrying locking mechanism 27 of any suitable kind for securing the door in closed position. Secured to the body walls 16 and 17 at or near the end thereof adjacent the door are the respective metal pieces 28 and 29 which have portions bent inwardly toward one another in order to produce channels or spaces 28' and 29' for receiving the inturned flanges 30 of the door closure 24. The edge walls 22 and 20, which come opposite to the door, are provided with suitable coin deposit slots 31 and 32, respectively, these slots being in suitable alignment so as to permit the entrance of coins into the coin deposit compartment 33.

For the purpose of carrying out my improvements, a suitable window framing 34 is incorporated in the body wall 16 and covering 19 thereof, and this framing is provided with two openings 35 and 36 in adjacency, as best shown in Fig. 1. The purpose of these openings, as will presently appear, is to provide for the display of suitable indicia on the faces of indicator mechanisms. By referring to Fig. 4, it will be seen that the indicator mechanisms may comprise a unit day disk dial 37 and a month disk dial 38, these two dials being mounted to revolve, respectively, on the stub shafts 39 and 40 which are fixed in a rectangular plate or frame 41 of a size adapted to be inserted into the coin deposit compartment 33 after the door or closure 24 has been opened. In the present embodiment, the frame of plate 41 is represented as being provided along each of its vertical edges and also along its bottom edge with flange portions as 42 which project laterally outwardly toward the front or window containing body wall 16. The free edges of these flanges terminate in a plane forwardly of the front surfaces of the dials 37 and 38 so that when the frame or plate is secured in position alongside the inner face of the body wall 16 with its top end adjoining the edge wall 20, as shown in Figs. 2 and 3, the said dials will be suitably housed for revolving motion in order to display their indicia through the openings 35 and 36. At its upper end, the frame or plate 41 is herein represented as being provided with an inwardly extending portion or flange 43 which engages flatwise against the edge wall 20 and is provided with a coin deposit slot 44 in alignment with the slots 32 and 31. Said flange 43 may be firmly yet detachably secured to the edge wall 20 by any suitable means, as by passing lugs or fingers 43' struck from said wall 20, through suitable openings provided for the purpose in the flange 43. At its opposite end, the frame or plate 41 may be secured in position as by means of a strip 46 one portion of which overlaps the inner face of the frame while another portion thereof overlaps the strip 28. Said strip 46 may be suitably soldered or spot-welded to the strip 28; or, if desired, it may be connected therewith by means of interlocking tongues (not shown) or equivalent devices.

The unit day dial 37 is made of a size sufficient to contain on its face adjacent its periphery numerals 47 indicative of the days in the longest calendar month, that is to say, numerals from one to thirty-one, inclusive. The month dial is provided on its face adjacent its periphery with abbreviations of the calendar months in proper succession as shown. As will be apparent from the drawings, these two dials are so arranged that when a day unit is exhibited in the opening 35 a month unit will appear in the opening 36. The month dial is equipped with twelve projecting teeth 48 in agreement with the number of months in a year. The unit day dial is provided with one tooth 49 adapted, on each revolution of this dial, to contact a tooth of the month dial and move, the latter a distance sufficient to bring the next succeeding month into display position in the opening 36.

Means are provided whereby automatically upon the deposit of each coin through the coin deposit slots 31, 32 and 44 to actuate the unit day dial a distance sufficient to bring into display position at the window 35 the next suceeding day digit. As shown in Figs. 2 to 6, inclusive, this means may comprise a coin tripping lever 50 the inner end of which is mounted to turn on the stub shaft 39, while the outer end thereof is provided with a laterally extending coin engaging flange 51 which lies closely adjacent the underside of the flange 43 and transversely thereof so as to partly close the slot 44. Said flange 51 works in a slot 52 provided in the plate 41, the walls defining the opposite ends of said slots serving as stops whereby to limit the range of movement of the coin tripping lever 50. 53 denotes a rocking lever which is pivoted to the plate 41 at 54 and is acted upon by a wire spring 55 so as to be normally urged into that position in which it will engage and contact the lever 50 and press the latter into position for partly closing the slot 44. Pivotally united at 56 with the rocking lever 53 is a pawl 57 which is normally pressed by a spring wire 58 into position for engaging the teeth of a ratchet wheel 59 mounted upon the stub shaft 39 between the lever 50 and the unit day dial 37. This ratchet wheel 59 is rigidly secured to the dial 37 so that these parts will rotate together, the securing means in the present instance being illustrated as consisting of pins 60 which rigidly connect the ratchet wheel and dial. A spring wire detent 61 is mounted to act on the ratchet wheel so as to prevent any retrograde thereof. In the present embodiment the spring wire 55 is represented as being engaged at one end in loop-like lugs 62 struck from the material of plate 41; and also in the present instance the spring wires 58 and 61 are represented as comprising portions of a single wire which is secured intermediate its length to lugs 63 struck from the plate 41. To better maintain the pawl 57 in operative position, a suitable pin-like protuberance 64 is pressed from the material of the plate 41. This protuberance engages the inner face of the pawl and serves as a rest for maintaining the pawl in proper operative position for acting on the teeth of the ratchet wheel. Under this arrangement, it will be evident that a coin in being pressed through the slot 44 will engage the flange 51 and force movement of the tripping lever 50 in a direction to rock the lever 53 thereby causing the pawl to move the ratchet wheel in a counterclockwise direction for displaying the next succeeding day digit at the window 35. As soon as the coin passes from the slot 44 into the coin deposit compartment 33, the spring wire 55 will cause repositioning of the levers 53 and 50 for the next operation. A spring wire detent 65 secured at or near one end to lugs 66 suitably struck from the material of the plate 41 engages with the teeth of the month dial so as to maintain the latter in the position in which it is moved by the unit day dial. With this arrangement, the unit day dial is actuated to bring a fresh unit into display at the window 35 each time a coin is inserted in the bank, and at the conclusion of a month of thirty-one days the month dial will be actuated to bring into display the new month in the window 36. Where a month has less than thirty-one days, the unit day dial may be operated manually until the new month appears behind the window 36. This may be done by inserting any suitable instrument, such for instance as a thin narrow knife blade, through the slots 31, 32 and 44 and applying the same against the coin engaging part 51 so as to effect actuation of the rocker 53. In practice a convenient instrument for effecting this manual operation may be furnished with the bank to the party having custody of the same. If, for one or more days, the owner of the bank fails to deposit coins, this fact will appear by noting the indicia displayed in the window.

It will be noted that the wall 20 is further provided with spaced pairs of protuberances 45 which are adapted to coact with the opposite longitudinal edges of the flange 43, as the tongues 43′ are received through the slots in said flange. The coin insertion slot 44 in said flange is thus accurately positioned in registering relation with the slot 32 in the plate 20 and the supporting plate 41 is automatically positioned in properly spaced parallel relation to the wall 16 of the bank, thus insuring free unrestricted operation of the registering mechanism. In this manner also, the indicia on the disks 37 and 38 is accurately located relative to the window openings 35 and 36. After clinching the lugs 43′ upon the flange 43, it is only necessary to then connect the strip 46 at the opposite end of plate 41 to the material strip 28′ on the bank wall 16, in order to complete the assembly.

In Figs. 7 and 8, I show a somewhat modified arrangement in the mechanism for actuating the unit day dial. In this arrangement, a pull spring 67 secured at one end to a lug 68 on the plate 41 and at the other end to the rocking lever 69, causes the rocking lever normally to assume the position in which the tripping lever 70 will be located where its flange 71 will partly cover the coin deposit slot 44 in the flange 43. A spring wire 72 engaged at one end with the rocking lever 69 and at the other end with the pawl 73, normally urges the pawl into that position in which it will engage the teeth of the ratchet wheel 59. In this instance, retrograde movement of the unit day dial 37 is prevented by a brake detent 74 which has resilient frictional bearing contact with the said dial 37.

In Figs. 9 and 10, I illustrate another arrangement of elements whereby to actuate the unit day dial 37. In this instance, a rocking lever 75 functions also as the tripping lever, its end adjacent the flange 43 being bent outwardly to provide a contact flange 76 adapted to partly cover the coin deposit slot 44. The lever 75 is normally urged by a spring wire 77 into position whereby to be actuated by a coin entered through the coin deposit slot 44. In this instance, also, I show a pawl 78 engaging with the ratchet wheel 59 to prevent any retrograde movement. A spring wire 79 may be employed to normally maintain the pawls 78 and 80 in proper operative engagement with the ratchet wheel.

In Fig. 11 I illustrate coin-actuated mechanism similar to that shown in Figs. 4, 5 and 6, but in this instance the dials instead of representing a unit day dial and a month dial, comprise a coin digit dial 81 and a dollar digit dial 82. In this embodiment, the coin digit dial is divided into three sets of digits from one to ten and for each tenth digit is provided a projecting tooth 83 so that simultaneously with each tenth actuation the dollar digit dial will be actuated. Thus, under this arrangement, when ten dimes have been inserted, said dial 82 will exhibit at the window 36 one dollar; when twenty dimes have been inserted said dial 82 will exhibit two dollars, and so on, with the deposit of ten coins the addition will appear in the form of the proper dollar digit exhibited at the window 36.

In Figs. 12 to 20, I show still another form of construction in which the interior of the book form casing is divided by a partition 84 into a relatively large collection chamber 85 and a relative small chamber 86. This partition includes side flange 87 adapted to engage flat-wise against the opposite vertical sides of the casing, an offset bottom flange 88 adapted to fit flatwise against the inturned flange 89 of bottom end 90 of the casing, and a top flange 91 which closes the top end of the collection chamber 85 and is adapted to fit against the in-turned flange 92 of the top end 93 of the casing. These flanges, or certain of them, may be rigidly secured to the parts against which they fit by spot-welding, soldering, or by any suitable expedient such as interlocking tongues and grooves. 94 denotes a coin guide and runway plate which is associated with the partition 84 so as to produce therewith a coin passage or chamber 95, this plate being offset at 96 to provide within and at the bottom of the coin passage 95 a runway 97 on which a coin will roll upon its circumference. The lower portion of the plate 94 is provided with slots 98 adapted to receive tongues 99 struck from the material of the partition; and the top lateral flange 91' of this plate is provided at its opposite ends with open slots 100 designed to receive cooperating tongues 101 struck from the material of the partition flange 91. The tongues 99 and 101, having been passed through their cooperating slots, are bent or preened over so as to secure the plate 94 rigidly to the partition.

102 denotes a vertically disposed channel-shaped slide having vertical side walls 103, 103 the tops of which 104, 104 are bent or disposed laterally in opposite directions so as to have slidable bearing fit against the underneath surface of the top end 93. This slide extends downwardly into the coin passage 95, its opposite side walls having sliding contact with the inner faces of the partition and guide plate 94, respectively. The side walls 103, 103 of the slide are provided with laterally projecting fins 105, 105, one of which has sliding fit in a longitudinal slot 106 provided in the plate 94 and the other of which has similar fit in a longitudinal slot 107 provided in the partition 84. At the left-hand end of the slide (as viewed in Fig. 12) the channel between the side walls 103, 103, is open, while the opposite end of the slide is closed by a vertical end 108 formed with an extension 109 which extends upwardly through the coin-deposit slot 110 so as to provide a finger piece 111 above the top end of the casing. The flange 91 of the partition has a slot 112 in which the slide is fitted for sliding movement; and for purposes of assembly, the said slot 112 is open at one end to permit the insertion of the slide thereinto prior to the application of one of the fins 105 to the slot 107 and prior to the application of the plate 94 in the slot 106 of which the opposite fin is entered. In the present embodiment, in order to provide for the full desired movement of the slide parallel with the plane of the runway 97 and at the same time to have for the abutment of a coin a solid or unbroken portion 113 in the flange 91, the sides 103, 103 of the slide are slotted as at 114, 114, which slots when the slide is moved to the left (as viewed in Fig. 12) permit the slide to move along said solid portion 113 to the full extent of the movement required of the slide for effecting its operative functions as will presently appear. A coil spring 115 one end of which is connected to one of the fins 105 and the other end of which is connected to the side wall of the casing, urges the slide in its proper retracted position and of course repositions it after each manual operation.

116 denotes a tripping or rocking lever one end of which is pivotally engaged with a bearing or boss 117 on the partition, and this lever is provided with a laterally projecting tongue 118 which extends through a suitable aperture 119 in the partition to lie across the coin passage 95 at the open end thereof adjacent the end 120 of plate 94. Said tongue 118, as clearly shown in Figs. 12, 13 and 14, extends upwardly at an angle to the plane of the runway 97 so that a coin inserted in the slide and rolled along the runway by the movement of the slide will be forced to impinge upon the tongue and thereby cause downward movement of the lever 116. At the time the coin engages the tongue 118 it has already passed underneath the solid abutment portion 113 of the flange 91 and being moved along the runway under the movement of the slide and confined by the abutment portion 113 against upward movement, the coin as it impinges upon the tongue 118 and moves the lever 116 downwardly eventually passes over said tongue and falls into the collection chamber 85. Under this arrangement, it will be obvious that the lever 116 cannot be operated by the movement of the slide unless a coin be first inserted through the coin deposit slot to fall into the channel of the slide and upon the runway 97. This arrangement, therefore, positively prevents any operation of the lever 116 except upon the deposit of a coin.

121 and 122 denote, respectively, day and month dials, the day dial being formed with a cup-shaped portion 123 in which the month dial is rotatably seated or nested, so that the axes of the two dials will be in alignment while the indicia-bearing surfaces thereof will be flush and in close relationship. The day dial 121 is formed with a hub portion 124 rotatably mounted in an opening or bearing 125 provided for the purpose in the partition. The month dial has a hub portion 126 rotatably engaging a stub projection 127 on a plate 128 secured to the adjacent side walls of the casing. The circumference of the day dial is provided with ratchet teeth 129 of which there is one for each of the day units or numerals (in the present embodiment thirty-one); and the month dial is provided at its circumference with inwardly directed rigid teeth 130 of which there is one for each of the twelve months.

For operating the day dial, the tripping lever 116 has pivoted thereto at 131 a vertical lever 132 which is provided with a laterally projecting lug or tooth 133 adapted to cooperate with the ratchet teeth of the day dial in such manner that each downward actuation of the tripping lever 116 will result in moving the day dial the distance of one tooth for exposing the next succeeding day numeral at the window 134 in the casing wall. The month dial is operated from the vertical lever 132, the means to this end consisting of a horizontal lever 135 and a reciprocating pawl 136. Said levers 132 and 135 are provided at their adjacent extremities with suitable bearing or contacting parts 137 and 138, respectively. The point of the pawl 136 normally rests against the exterior circumference 139 of the day dial, and in this circumference there is provided an aperture 140 through which the pawl point may pass for engagement with a ratchet tooth of the month dial. There is only one aperture 140 and this, of course, is located in such position that when the last day of the month, for instance, the thirty-first day, is exposed at the window 134, the pawl point may engage with the ratchet tooth of the month dial corresponding with the next succeeding month. Referring to Figs. 12 and 19 and assuming that "May 31" is exposed at the window 134 and assuming further that the lever 116 is moved downwardly by a coin moved by the slide, it will be understood that this movement will result in operating the day and month dials simultaneously so that "May 31" will be moved from display position at the window 134 and "June 1" moved into display position. The two levers 132 and 135 are maintained in proper operative relation by means of a spring wire 141 one terminal portion of which bears inwardly against the lever 132 while the other terminal portion of this wire bears upwardly against the lever 135. The spring portion bearing upwardly against the lever 135 will, it will be noted, serve as means whereby to reposition the lever 132 and the tripping lever 116 after each operation. A spring wire 142 has one end portion thereof bearing against the pawl 136 so as to depress the pawl in the direction to enter its point through the aperture 140, while the opposite end portion of this wire is in engagement with the ratchet teeth of the day dial to prevent retrograde movement thereof. The month dial is maintained stationary in the position to which it is moved by means of a button-like projection 143 provided on the member 128, this button-like projection being adapted to click into and out of suitable circular recesses 144 of which there is one for each of the months of the year.

In this embodiment of my invention, it will be noted that all of the working parts are located in the chamber 86 and are compactly arranged therein. Due to this compact arrangement, the collection chamber 85 may be relatively large as shown so that the bank may contain a large quantity of coins. It will also be observed that the chamber 86 wherein the dials are located is inaccessible. This is an important advantage since there can be no tampering with the dials. In view of this arrangement and in order to set the dials initially or at any time they may require resetting, I provide a key 145 which is insertable through an eyelet 146 provided in the side of the casing in alignment with the axes of the two dials. This key is made with a reduced end portion 147 of a length adapted to engage at the same time in the slots 148 and 149 provided in the hub portions of the respective dials. Associated with this key is an adjustable gauge 150 adapted to abut against the outer face of the eyelet 146. Through the adjustment of the gauge along the stem of the key, the reduced portion 147 may be permitted to engage both of the slots 148 and 149 or to engage the slot 148 alone. When the reduced portion of the key is engaged with the slots of both of the dials, it will be manifest that through the manipulation of the key from the outside of the casing the month dial may be set so as to expose at the window the month desired. With this setting of the month dial the day dial is of course also turned, but this turning is immaterial. On the other hand, when the key is adjusted so as to engage with the slot of the day dial alone, the day dial alone will be turned to bring into display position at the window the desired day of the month.

It will be evident that the constructions hereinbefore set forth are capable of considerable range of change and modification without in any manner departing from the spirit of my invention and I accordingly do not wish to be understood as limiting myself to the specific details of construction hereinbefore set forth except as hereinafter claimed.

I claim:

1. In a coin bank which includes side walls and edge walls, one of the side walls containing a window and one of the edge walls containing a coin slot, a rigid supplementary end edge wall disposed inwardly of the coin slot edge wall and having a coin slot aligned with the coin slot of that wall, framing detachably fastened to said supplementary wall including a sheet disposed inwardly from and parallel to said window containing side wall and forming therewith a shallow chamber separated by the sheet from the hollow interior into which coins may be passed through said slots, a pair of cooperating disks in said chamber revoluble on parallel transverse axes carried by said framing and having dial faces for exhibit behind said window, a swingable member in the hollow interior adapted to be actuated by a coin prossed through said slots, extending into said chamber through a transverse slot in said sheet and pivotally mounted on said sheet in said chamber, and transmission mechanism within said chamber mounted on said sheet for operation by the actuation of said swingable member and having connection with one of said disks for imparting driving movement thereto, all of said working parts being removable as an entity arrangement with the detachable framing by which they are solely supported.

2. In a coin receiving bank which includes a rectangular bank body having a wall at one edge thereof provided with a coin receiving slot and opposite thereto an edge door by which to close a doorway between the side walls of the body, an inner slotted wall supported inwardly of and parallel to said first wall, an indicator unit carrying revoluble indicating means disposed within the body, means for spacing the unit in a definite position between the side walls to form with one of them a chamber for the indicating means, said spacing means including a slotted flange extending laterally from the top portion of the unit, disposable parallel underneath said inner wall, tongues carried by said inner wall engageable in said slots to detachably secure said unit to said inner wall, and means carried by the indicator unit for operating the indicating means and adapted to be operated by the engagement therewith of a coin entering into the bank, said indicator unit with its subjoined parts adapted to be passed as an entity through said doorway.

3. In a coin receiving bank which includes a bank body having side walls spaced from fixed edge walls, a hinged edge wall between said side walls to give access to the bank through a doorway between the side walls, one of said side walls having a window, a fixed edge wall opposite said hinged edge wall having a coin deposit slot therein, an inner slotted wall disposed in spaced relation to said latter wall, an indicator assembly disposable within the bank comprising a sheet with spacer parts for spacing it in position to form a definite indicator chamber separated by the sheet from a definite coin chamber into which the coin deposit slot feeds, a slotted lateral member on the sheet engaging against said inner slotted wall and having a coin deposit slot to align with the slot of said inner wall and said fixed edge wall, tongues carried by said inner wall engaging through the slots of said lateral member for detachably connecting said lateral member and said inner wall to hold the sheet in its definite position, indicator mechanism including means for operating it mounted on said sheet, said mechanism being disposed to revolve behind said window and said operating means including an arm disposed to be actuated by a coin pressed through said coin deposit slots, said assembly as a complete unit being constructed to be passed through said doorway when the hinged edge wall is in open position.

4. In an indicator unit for connection within a coin receiving bank, the combination of a supporting structure including a plate disposed in parallel relation to a wall of said bank, an inner slotted wall fixed within said bank and disposed at right angles to said plate, a flange carried by one edge of said plate engaging against said inner wall, said flange having slots therein, tongues carried by said inner wall engaging in said slots said flange to detachably secure said plate within said bank, said flange also having a coin deposit slot therein, cooperating indicia bearing disk dials revoluble on parallel axes secured to said plate, means by which to operate one of the dials comprising a ratchet attached thereto, a rock lever rockable about the axis of one of said dials, a lateral projection carried by an end of said rock lever extending across said coin deposit slot of said flange for engagement and actuation by a coin pressed through said coin deposit slot, a second rock lever having an end disposed in the path of movement of said first rock lever, a pawl carried by the opposite end of said second rock lever engageable with said ratchet to move said ratchet in one direction and correspondingly the dial to which the ratchet is attached, and a spring-pressed pawl engaging said ratchet to hold said ratchet against reverse movement.

5. In a coin receiving bank comprising a bank body which includes side and edge walls provided respectively with a window display opening and a coin deposit slot, an inner wall disposed within the body in parallel relation to a side wall and forming therein a housing enclosing a space with said side wall and having a slotted lateral extension, a second inner wall disposed in parallel relation to said slotted lateral extension, said second inner wall having a coin deposit slot, tongues carried by said second inner wall engaging in the slots of said lateral extension for detachably connecting the extension with said second inner wall so as to maintain the coin-deposit slots thereof in register, cooperating indicia bearing disk dials revolubly mounted on the first inner wall within said space and lying in a plane parallel with said side wall, said dials being adapted to simultaneously display elements of their indicia at said window opening, a movable member having movement in a guide slot on said first inner wall, extending from said space and having a portion movable along said extension and disposed to be engaged and moved by a coin which is entered through the registering coin deposit slots, actuable means on the first inner wall within said space adapted to be operated by said member for actuating one of said dials whereby movement of said member will cause actuation of said dials, said bank body having opposite said slotted edge wall an edge doorway through which said first inner wall with adjunctive parts can be passed as an entity, and an edge door for closing said doorway.

6. In a coin registering unit for banks, a supporting plate having a flange at one end to extend transversely between opposite side walls of the bank and provided with a coin insertion slot, an indicia bearing disk revoluble on an axis carried by said plate, means for operating said disk comprising a ratchet attached thereto, a rock lever rockable about said axis, a lateral projection carried by one end of said rock lever extending across said coin insertion slot for engagement and actuation by a coin pressed through said slot, a second rock lever having an end disposed in the path of movement of said first rock lever, a pawl carried by the opposite end of said second rock lever engageable with said ratchet to move said ratchet and disk in one direction, and a spring-pressed pawl engaging said ratchet to hold the ratchet and disk against reverse movement.

7. A coin bank case having side walls narrowly spaced apart with respect to the width and length of the case, one of said walls having a window and closures for the opposite ends of the bank case, one of said closures having a coin insertion slot, a coin registering unit including a supporting plate of less width than the bank case and registering mechanism mounted thereon, having parts relatively movable in parallel relation to said plate, said unit being insertable through one end of the bank case in parallel relation with the side walls and movable longitudinally thereof, spaced means projecting inwardly from the closure for the other end of the bank case to coact with and hold said plate against lateral or transverse displacement and position said plate and the registering mechanism relative to said window, and means within the bank case connected with the other end of the said plate to retain the latter in fixed relation to the case walls.

8. In combination with a coin bank case having closely spaced side walls and a permanent closure connecting said walls at one end of the case and provided with a coin insertion slot, a hinged door for closing the opposite end of said case; a coin operated registering unit comprising a supporting plate and registering mechanism mounted wholly on one side of said plate and insertable through the latter end of the bank case to position said mechanism for movement between and in parallel relation with said plate and a side wall of the bank case, a coin engageable part for actuating said registering mechanism, one end of said supporting plate having means coacting with means on said permanent closure to position said part relative to the coin insertion slot and prevent displacement of said end of the plate relative to the case walls, and additional means within the other end of the bank case, independent of said hinged door, and connected with the other end of said supporting plate to retain the same in fixed relation to the case walls.

DAVID H. ZELL.